United States Patent Office.

EDWARD WATSON, OF GRAND RAPIDS, MICHIGAN.

COMPOSITION OF MATTER FOR RESTRAINING THE SETTING OF PLASTER COMPOUNDS.

SPECIFICATION forming part of Letters Patent No. 446,604, dated February 17, 1891.

Application filed December 29, 1890. Serial No. 376,102. (No specimens.)

*To all whom it may concern:*

Be it known that I, EDWARD WATSON, a citizen of the United States, residing at Grand Rapids, in the county of Kent and the State of Michigan, have invented a new and useful Composition of Matter for Restraining the Setting of Plaster Compounds, of which the following is a specification.

My composition consists, essentially, in combining with calcined gypsum a leguminous substance, such as beans, peas, lentils, &c.

In practice I may first grind the dry leguminous substance to a fine powder and mix the powder in the water with which the mortar is to be made, or I may mix the dry powder with dry calcined gypsum at any time previous to mixing the mortar. Again, I may first boil the leguminous substance with a solution of caustic alkali, which renders it more soluble, and thus a much less quantity will be required to restrain the setting of the plaster.

In preparing the material by first decomposing the leguminous substance with caustic alkali I proceed as follows: As a source of caustic alkali I generally roll carbonate of soda, soda-ash, and add enough lime to combine with the carbonic acid, and thus liberate caustic soda.

In practice I take of dry leguminous substance, such as beans, peas, lentils, &c., one pound; slaked lime, half a pound; carbonate of soda, one pound; water, one quart or more, and boil all together until the leguminous substance is decomposed and a pasty mass formed. I then add to the pasty mass one pound or more of an alkaline earth or any salt of an alkaline earth or any salt of a caustic alkali. The mixed pasty mass of leguminous matter and chemicals is now evaporated to dryness by any convenient method and finally pulverized or ground to a powder, which constitutes my retarding material, and may be mixed with the water in which the mortar is to be mixed; or it may be intimately mixed in proper proportions with dry calcined gypsum, and thus be ready to use at any subsequent time. This makes an excellent compound for restraining the setting of plaster compounds, and has a great and very desirable property of not being liable to decomposition, as animal matter is when used as a restrainer, and in damp weather emits a disagreeable odor in closed rooms.

In estimating the proportion of my restraining material to be used the weight of dry leguminous matter taken in making the compound must be considered and an allowance made for the salts combined with it. A very small quantity will have a restraining effect on plaster, and the proportion to the dry calcined gypsum entering into the composition of the mortar must be according to the time required to set the plaster back. If the pure dry flour of beans, peas, lentils, &c., be used, from ten to forty pounds to a ton of calcined gypsum will be about right to retard the setting from half an hour to several hours. If the compound mixture of leguminous matter and alkali and other salts be used, the same quantity, ten to forty pounds, will be sufficient.

In using this restraining material care must be taken to strictly comply with the above proportions, or the plaster may be so much set back as to injure its hardness when set. If used in as small a quantity as possible, it has a hardening effect on the plaster when set and dry.

What I claim is—

The herein-described composition of matter for restraining the setting of plaster, consisting, essentially, of a leguminous substance, such as peas, beans, lentils, &c., slaked lime, carbonate of soda, an alkaline earth or a salt of an alkaline earth, or a salt of a caustic alkali, substantially as shown by the specification, and for the purpose specified.

EDWARD WATSON.

Witnesses:
C. L. HARVEY,
C. J. DE YOUNG.